July 8, 1969     R. E. LIPPIATT     3,454,253
CAMPER HOLD DOWN BRACKETS FOR PICKUP TRUCKS
Filed June 20, 1967

INVENTOR.
ROY E. LIPPIATT
BY W. B. Hausman
ATTORNEY

United States Patent Office 3,454,253
Patented July 8, 1969

3,454,253
CAMPER HOLD DOWN BRACKETS FOR
PICKUP TRUCKS
Roy E. Lippiatt, R.D. 5, Salem, Ohio 44460
Filed June 20, 1967, Ser. No. 647,474
Int. Cl. B65j 1/22; B61d 45/00; B62d 23/00
U.S. Cl. 248—361               1 Claim

ABSTRACT OF THE DISCLOSURE

Hold down brackets insertable in stake pockets in pickup truck bodies providing attachment means to which camper bodies mounted on the pickup trucks may be attached.

---

The principal object of the invention is the provision of a hold down bracket that is universally adaptable for mounting in various sized and shaped pockets in a pickup truck body to provide an anchoring member to which a camper body may be attached.

A further object of the invention is the provision of a hold down bracket for a pickup truck body that eliminates the necessity of drilling holes in the body and is installed in the stake pocket of the pickup body.

A still further object of the invention is the provision of a hold down bracket for a pickup truck body that may be altered in size and shape by adding or removing portions thereof from the section of the bracket inserted in the stake pocket of the pickup truck body. The hold down brackets for pickup truck bodies disclosed herein are particularly useful in securing camper bodies to the pickup truck bodies. It is well known in the art that many camper bodies and the like are regularly installed on pickup trucks, and that it has heretofore been necessary to mount attachment means on the pickup truck bodies to which the camper bodies could be secured. The present invention provides a bracket, including a stake-like portion that engages the stake pockets in the pickup truck body and provides an outwardly and downwardly extending section exteriorly of the pickup body to which clamping means can be attached and engaged upon a camper body. Thus the camper body is securely mounted on the pickup truck body and secured to the body structure thereof by the stake pocket configuration built therein, thus eliminating the heretofore believed necessary drilling of holes in the pickup truck body and mounting various mounting brackets, etc. thereto.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

Brief summary

The hold down bracket for a camper has a vertically disposed square shaped body member which is secured in position in the stake hold of the truck side wall and has at its upper end a laterally and horizontally extending flat bar which extends downwardly and has an aperture in its lower end for receiving means to tie the camper to the body member.

The invention is illustrated in the accompanying drawing, wherein.

Figure 1:
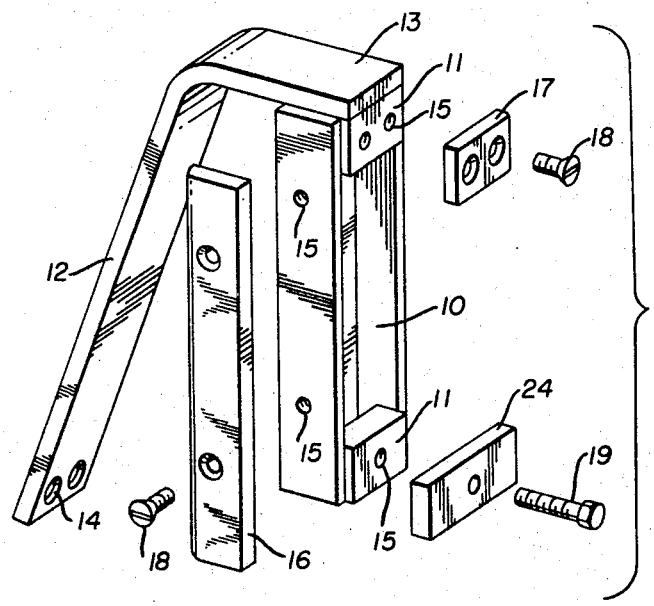
FIGURE 1 is a perspective view showing in exploded detail the various portions of a hold down bracket.

By referring to the drawing and FIGURE 1 in particular, it will be seen that the hold down bracket comprises a vertically positioned stake pocket engaging body member 10 formed of a cross-sectionally U-shaped channel with end portions 11 welded therein and including an outwardly and downwardly extending arm 12, the upper horizontally disposed end portion 13 of which is welded to the upper end of the stake pocket engaging member 10. The lower end of the angular portion of the arm 12 is apertured as at 14, and one side and the end portions 11 of the stake pocket engaging body member 10 are drilled and tapped as at 15 so that spacing members 16 and 17 respectively may be secured thereto by fasteners 18. The configuration of the stake pocket engaging body member 10 may thus be altered by adding the spacing members 16 and 17, and it will occur to those skilled in the art that the hold down bracket can thus be adapted to the cross-sectionally square stake pockets including those wherein a taper is found, as well as the stake pockets that are rectangular in cross-sectional configuration.

The device is formed of steel, and the stake pocket engaging body member 10, the end portions 11 and the arm 12 are welded in an integral unit.

Figure 2:
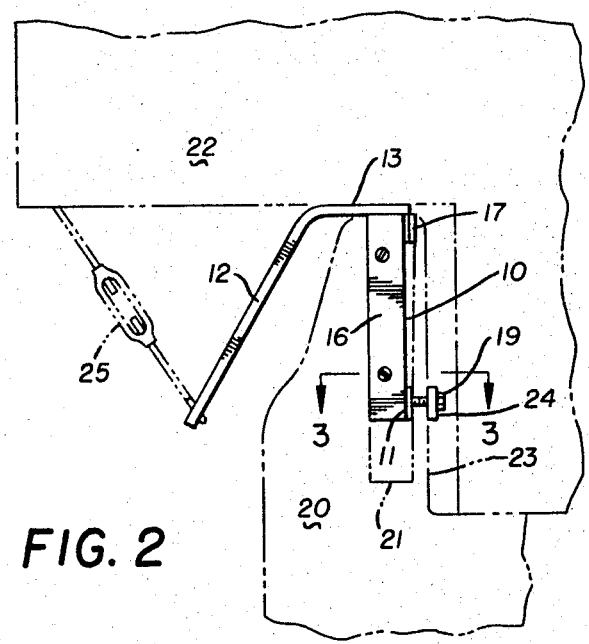
FIGURE 2 is a front elevation of the hold down bracket with broken lines indicating a portion of a pickup truck body and a stake pocket therein, and a camper body positioned on the pickup truck body with means engaging the hold down bracket.

By referring to FIGURE 2 of the drawing, broken lines illustrate a quarter panel of a pickup truck body 20 with a stake pocket 21 formed therein, and a camper body 22 positioned on the pickup body 20. One of the hold down brackets is seen installed and it will be observed that the stake pocket engaging body member 10 is shown in the stake pocket 21 and that a fastener 19 extends through the inner wall 23 of the pickup truck body 20 and through an apertured plate 24 positioned on the inside thereof, and thus holds the stake pocket engaging body member 10 in position in the stake pocket 21. The horizontal portion 13 of the arm 12 extends outwardly and beneath the camper body 22 and a clamping device including a turn buckle 25 is engaged between the camper body 22 and the lower end of the arm 12, thus securely anchoring the camper body to the pickup truck body 20 by way of the hold down bracket, as disclosed herein.

Figure 3:
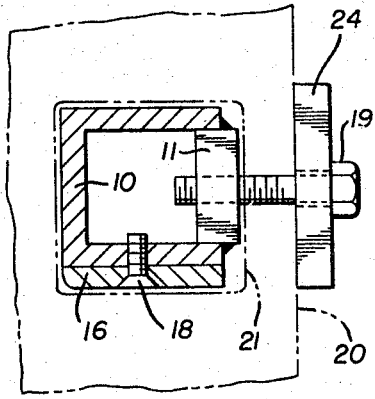
FIGURE 3 is an enlarged cross-section on line 3—3 of FIGURE 2.

In FIGURE 2 of the drawing the spacing members 16 and 17 are shown increasing the effective size of the stake pocket engaging body member 10 so that the same will fit a tapered stake pocket such as 21 in the drawing. When the spacing members 16 and 17 are removed the stake pocket engaging body member 10 is cross-sectionally square, except for its corners, as best seen in the cross-section comprising FIGURE 3 of the drawing.

It will thus be seen that camper hold down brackets for pickup trucks have been disclosed which meet the several objects of the invention, and having thus described my invention, what I claim is:

1. A hold down bracket for use with a truck body wall having an opening therein for securely receiving said bracket to hold a camper or the like on said body, said bracket comprising a vertically disposed body member substantially square in cross-section throughout its length with the lower end thereof terminating in a free edge, means for increasing the cross-sectional area of said body member, said means comprising filler blocks, rectangular in cross-section, detachably secured to the sides of said body member, an arm attached to the upper end of said body member and extending outwardly therefrom, said arm having a flat horizontal part having one end portion thereof rigidly secured to the said upper end of said body member and the other end portion extending outwardly of said body member and terminating in a downwardly bent part angularly disposed with respect to said horizontal part and provided with an aperture in its lower end for receiving means to tie said camper or the like to said body, and means for securing said bracket to said truck body.

References Cited

UNITED STATES PATENTS

| | | | |
|---|---|---|---|
| 3,356,408 | 12/1967 | Stutz | 296—23 |
| 1,495,442 | 5/1924 | Rosencrans | 248—119 X |
| 2,611,501 | 9/1952 | Bermann | 248—27 X |
| 2,943,832 | 7/1960 | Bouchard | 248—43 |
| 3,099,109 | 7/1963 | Hahn | 287—20.3 |
| 3,155,771 | 11/1964 | Steger et al. | 248—361 X |
| 3,343,503 | 9/1967 | Johnson. | |
| 3,362,672 | 1/1968 | Wigam | 248—361 |
| 3,368,785 | 2/1968 | Weiler | 248—361 |

CHANCELLOR E. HARRIS, *Primary Examiner.*

JOHN PETO, *Assistant Examiner.*

U.S. Cl. X.R.

105—369; 296—23, 35